(12) United States Patent
Träff et al.

(10) Patent No.: US 10,154,196 B2
(45) Date of Patent: Dec. 11, 2018

(54) ADJUSTING LENGTH OF LIVING IMAGES

(71) Applicant: Microsoft Technology Licensing, LLC, Redmond, WA (US)

(72) Inventors: Gustav Träff, Södra Sandby (SE); To Tran, Arlöv (SE); Tor Andrae, Dalby (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/721,183

(22) Filed: May 26, 2015

(65) Prior Publication Data

US 2016/0353052 A1    Dec. 1, 2016

(51) Int. Cl.
*H04N 1/21* (2006.01)
*H04N 5/232* (2006.01)
(Continued)

(52) U.S. Cl.
CPC ......... *H04N 5/23245* (2013.01); *H04N 1/212* (2013.01); *H04N 21/8549* (2013.01); *G11B 27/031* (2013.01); *G11B 27/28* (2013.01); *H04N 5/23219* (2013.01); *H04N 5/23254* (2013.01); *H04N 5/23258* (2013.01); *H04N 5/23267* (2013.01); *H04N 5/77* (2013.01)

(58) Field of Classification Search
None
See application file for complete search history.

(56) References Cited

U.S. PATENT DOCUMENTS 6,985,827 B2    1/2006  Williams et al.
7,652,695 B2    1/2010  Halpern
(Continued)

FOREIGN PATENT DOCUMENTS

EP   2129111 A1   12/2009
WO   2011098899 A1   8/2011
WO   2014031834 A1   2/2014

OTHER PUBLICATIONS

Fraser, Adam, "Relive those moving moments with Nokia Living Images", Published on: Apr. 15, 2014 Available at: http://lumiaconversations.microsoft.com/2014/04/15/relive-those-moving-moments-with-nokia-living-images/.

(Continued)

*Primary Examiner* — Justin P. Misleh

(57) ABSTRACT

A method may comprise: obtaining a preliminary frame sequence and at least one still image frame, captured by a digital camera during shooting a scene; obtaining at least one of indication of fulfillment of a predetermined starting scene condition in at least one frame of the preliminary frame sequence and indication of fulfillment of a predetermined first camera condition prevailing during capturing the preliminary frame sequence; automatically selecting a starting frame from the preliminary frame sequence on the basis of at least one of fulfillment of the starting scene condition and fulfillment of the first camera condition; and automatically forming, from the preliminary frame sequence and the at least one still image frame, a displayable frame sequence for displaying a living image of the scene, the living image comprising a still image and a preceding image sequence, the frame sequence starting by the starting frame and having a still image frame as a stopping frame for displaying the still image.

20 Claims, 6 Drawing Sheets

(51) Int. Cl.
*H04N 21/8549* (2011.01)
*G11B 27/031* (2006.01)
*G11B 27/28* (2006.01)
*H04N 5/77* (2006.01)

(56) References Cited

U.S. PATENT DOCUMENTS

| | | | |
|---|---|---|---|
| 7,817,914 B2 | 10/2010 | Kuberka et al. | |
| 7,986,339 B2 | 7/2011 | Higgins | |
| 8,122,378 B2 | 2/2012 | Ciudad et al. | |
| 8,587,670 B2 | 11/2013 | Wood et al. | |
| 8,649,660 B2 | 2/2014 | Bonarrigo et al. | |
| 8,913,147 B2 | 12/2014 | Escobedo | |
| 8,957,915 B1* | 2/2015 | Chalasani | G09G 5/377 345/473 |
| 2003/0112874 A1 | 6/2003 | Rabinowitz et al. | |
| 2011/0102616 A1* | 5/2011 | Migiyama | G11B 27/3027 348/222.1 |
| 2013/0057713 A1 | 3/2013 | Khawand | |
| 2013/0182166 A1* | 7/2013 | Shimokawa | H04N 5/23245 348/333.01 |
| 2013/0258059 A1 | 10/2013 | Ma et al. | |
| 2014/0063186 A2* | 3/2014 | Chauvier | G11B 27/005 348/43 |
| 2014/0111662 A1* | 4/2014 | Mashiah | G06T 13/80 348/220.1 |
| 2014/0300814 A1 | 10/2014 | Lemoine | |
| 2014/0359447 A1 | 12/2014 | Kannan et al. | |
| 2014/0376877 A1* | 12/2014 | Nozaki | H04N 5/915 386/230 |
| 2015/0104113 A1* | 4/2015 | Ugur | G06K 9/34 382/283 |
| 2015/0324096 A1* | 11/2015 | Leblanc | G11B 27/034 715/720 |
| 2016/0093335 A1* | 3/2016 | Doepke | H04N 1/212 386/226 |

OTHER PUBLICATIONS

"Ease-of-Use", Published on: Mar. 12, 2011 Available at: http://www.usa.canon.com/cusa/consumer/standard_display/PS_Advantage_Ease.

Soukup, Ladislav, "Living Photos—What It Is & How to Make Them", Published on: Nov. 2013 Available at: https://ladasoukup.cz/2013/11/living-photos-what-it-is-how-to-make-them/.

"International Search Report and Written Opinion Issued in PCT Application No. PCT/US2016/031691", dated Aug. 9, 2016, 13 Pages.

Fajardo, Romeo, Jr., "The Next Big Thing with Nokia Lumia Photography—Living Images!—Nokia Revolution", Retrieved from <<http://nokiarevolution.com/the-next-big-thing-with-nokia-lumia-photography-living-images/>>, Retrieved Date: Apr. 5, 2014, 2 Pages.

Kronfli, Basil, "What is HTC Zoe?| KnowYour Mobile", Retrieved from <<http://www.knowyourmobile.com/htc/htc-one/19550/what-htc-zoe>>, Retrieved Date: Aug. 14, 2014, 3 Pages.

Wong, Felix, "Windows Phone 8.1 vs. Windows 10 Mobile on Microsoft Lumia 640 XL", Retrieved from <<http://felixwong.com/2015/12/windows-phone-8-1-vs-windows-10-mobile-on-microsoft-lumia-640-xl/>>, Retrieved Date: Dec. 20, 2015, 6 Pages.

"International Preliminary Report on Patentability Issued in PCT Application No. PCT/US2016/031691", dated Apr. 24, 2017, 08 Pages.

* cited by examiner

ADJUSTING LENGTH OF LIVING IMAGES

BACKGROUND

Digital cameras may be used to capture still images and videos. Captured images may be combined to form displayable collections of images. Digital cameras or digital camera modules may also be incorporated in various other types of devices, such as mobile and wearable devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is disclosed which may be used to form a displayable frame sequence to be displayed as a living image of a scene, the living image comprising a still image and a preceding image sequence. The method may comprise obtaining a preliminary frame sequence and at least one still image frame, captured by a digital camera during shooting a scene; obtaining at least one of indication of fulfillment of a starting scene condition in at least one frame of the preliminary frame sequence and indication of fulfillment of a predetermined first camera condition prevailing during capturing the preliminary frame sequence; automatically selecting a starting frame from the preliminary frame sequence on the basis of at least one of fulfillment of the starting scene condition in at least one frame of the preliminary frame sequence and fulfillment of the first camera condition prevailing during capturing the preliminary frame sequence; and automatically forming, from the preliminary frame sequence and the at least one still image frame, a displayable frame sequence for displaying a living image of the scene, the frame sequence starting by the starting frame and having a still image frame as a stopping frame for displaying the still image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present embodiments and is not intended to represent the only forms in which the present embodiments may be constructed or utilized. The description sets forth the functions of the embodiments and the steps for constructing and operating the embodiments. However, the same or equivalent functions and sequences may be accomplished by different embodiments.

Figure 1:
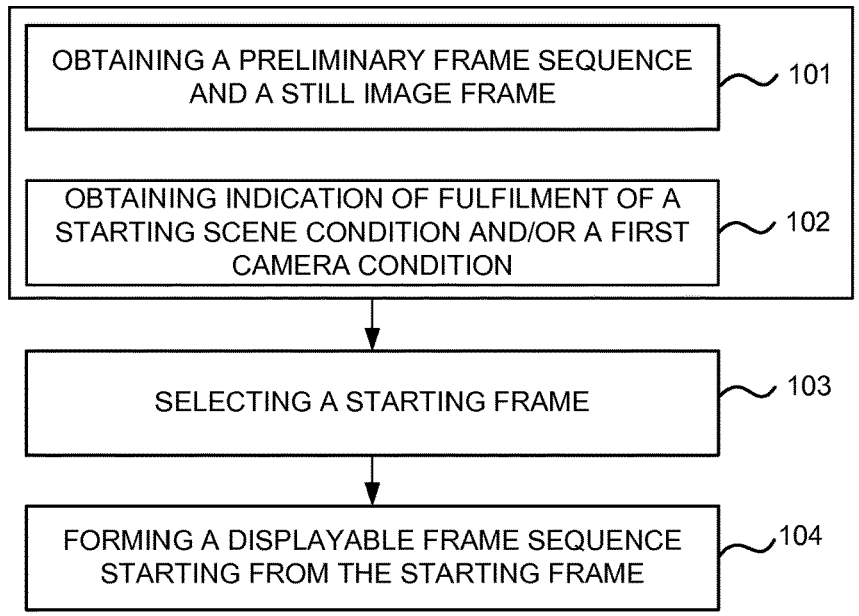
FIG. 1 illustrates a flow chart of a method.

The method of FIG. 1 may be used for forming a displayable frame sequence to be displayed as a living image of a scene. "Living image" refers to a collection of images displayed as a combination of a still image and a short video or other type of sequentially displayed image sequence preceding the still image. By forming such living image, a representation of a captured moment may be generated which corresponds to the general nature of the scene. The length of such short preceding image sequence displayed in connection with the still image may vary, for example, from 200 to 300 ms to one or a couple of seconds.

A "frame" refers to a digital image data captured via exposure of pixels or some other light-sensing element(s) of an image sensor. In general, a frame may be used to produce or display one single still picture or image, the latter terms being used as synonyms to each other. A frame may also be one frame of a plurality of sequential frames for producing or displaying a sequence of images, for example, for a video sequence.

The method of FIG. 1 starts by obtaining, in step 101, a preliminary frame sequence as well as at least one still image frame, all the frames being captured by a digital camera during shooting a scene.

"Scene" refers to the hole content in the object area shot by the camera, comprising as well the general background of the scene as any movable or stationary objects therein.

In general, the preliminary frame sequence may comprise any appropriate number of frames. The number of frames may correspond to, for example, a displayable image sequence having a maximum length of about 1 to 3 seconds. The actual number of frames then depends on the frame rate to be used when displaying the preceding image sequence of the final living image. For example, with a constant frame rate of 30 fps (frames per second), the number of frames may be about 30 to 60 frames.

Instead of a constant frame rate, the preceding image sequence of the living image may be displayed using a non-constant frame rate. For example, the frame rate may slow down towards the still image. Alternatively, the frames of the preliminary frame sequence may be captured with non-constant capturing frame rate increasing towards the end of the preliminary frame rate. Then, a slowing down effect of the living image towards the end of the preceding image sequence may be produced with constant frame rate used in displaying the frames.

Being captured during shooting a scene means that the frames of the preliminary frame sequence and the still image frame(s) represent sequential moments of the scene. The frames of the preliminary frame sequence may represent sequential moments separated from each other, for example, by a time interval of 5 to 100 ms. There may be similar interval also between the last frame of the preliminary frame sequence and the first still image frame. Alternatively, that interval may also be longer, for example, up to 200 ms.

In addition to obtaining the actual preliminary frame sequence and the at least one still image frames, also at least one of indication of fulfillment of a predetermined starting scene condition in at least one frame of the preliminary frame sequence and indication of fulfillment of a predetermined first camera condition prevailing during capturing the preliminary frame sequence is obtained in the method, in step 102. Obtaining the indication of fulfillment of the starting scene condition and/or the first camera condition may take place before, simultaneously with, or after obtaining the actual preliminary frame sequence.

"Indication of fulfillment" of a condition refers to information, expressed in any form of data, which indicates that the condition at issue is or has been met. Information about whether a condition is met may be attached to or associated with each frame. For example, in addition to obtaining the preliminary frame sequence, corresponding data sequence may be obtained containing, for each frame, indication of fulfillment or non-fulfillment of the starting scene condition and/or the first camera condition.

After obtaining the preliminary frame sequence and the one or more still image frames as well as the indication of fulfillment of the starting scene condition and/or the first camera condition, the method comprises automatically selecting, in step 103, a starting frame from the preliminary frame sequence on the basis of at least one of fulfillment of the starting scene condition and fulfillment of the first camera condition.

"Automatically" refers generally to performing the operation(s) at issue, for example, selecting the starting frame, by an appropriate data processing unit or module according to predetermined rules and procedures, without need for any contribution provided or determination performed by a user of a device incorporating such unit or module.

Selecting the starting frame "on the basis of" fulfillment of one or both of the starting scene condition and the first camera condition refers generally to taking into account fulfillment of at least one of those conditions in the selection process so that the fulfillment of at least one of those conditions affect the final outcome of the selection.

The method of FIG. 1 further comprises automatically forming, in step 104, from the preliminary frame sequence and the at least one still image frame, a displayable frame sequence for displaying a living image of the scene comprising a still image and a preceding image sequence. The displayable frame sequence starts from the selected starting frame, and comprises also the rest of the frames of the preliminary frame sequence following the starting frame. One of the possibly many still image frames initially obtained serves as the last frame of the displayable frame sequence. The frames of the preliminary frame sequence included in the displayable frame sequence may be modified on the basis of image data of one or more of the other frames of the preliminary frame sequence or the still image frame(s). Further, in addition to frames picked from the preliminary frame sequence and the at least one still image frame, also completely new additional frame(s) may be included in the displayable frame sequence, formed on the basis of image data contained in two or more original frames of the preliminary frame sequence or the still image frame(s).

The starting scene condition, the fulfillment of which serving as one possible selection criterion for the starting frame, may comprise any appropriate condition(s) based on which a reasonable selection of the starting frame may be made. The purpose of the method may be, for example, to provide a living image representing characteristic features or general nature of an event in the capturing scene, whereby the starting scene condition may be determined accordingly.

In one embodiment, the starting scene condition requires movement occurring in the scene shot by the camera during capturing the frames of the preliminary frame sequence. Such movement can be, for example, rotational and/or translational movement or any other type of movement of an object lying within or forming a part of the scene. A moving object within the scene may be, for example, a human being, an animal, a vehicle, a plant, or any other object affecting the general nature of the captured moment. A moving part of the scene not considered as a discrete object, in turn, may comprise, for example, flowing water. In general, movement in the scene as a starting scene condition may relate to any kind of information about living content in the scene, "living" referring to any type of non-stationary content. For example, the starting scene condition may comprise some characterizing parameter serving as a measure of general level of movement in the scene. It may comprise information of one or more specific objects moving in the scene, as well as any appropriate quantitative and/or qualitative features of the movement of such object(s). To summarize, movement refers generally to any kind of information about movement of at least part of the scene covered by the frames.

Movement occurring in the scene may be used as a condition for determining whether to form any living image at all. In such approach, if no indication of fulfillment of a starting scene condition requiring movement occurring in the scene is obtained, a still image frame may be recorded for displaying a normal still image of the scene instead of a living image. Instead, when indication of fulfillment of such starting scene condition is obtained, this may result in automatically forming a displayable frame sequence according to the process of FIG. 1. The actual starting frame may then be selected on the basis of various criteria. For example, selection can be based on some further condition related to the movement, or on the basis of some other starting scene condition not directly related to the movement in the scene.

In one embodiment, in addition to or instead of movement occurring in the scene, the starting scene condition may require a predetermined relevant change occurring in the scene. "Relevant change" refers to any appropriate change which can be used to select the starting frame, thereby selecting a reasonable length and starting point for the displayable frame sequence for the living image.

The predetermined relevant change may require, for example, appearing of a human face in the scene during capturing the frames of the preliminary frame sequence. For example, when a human face has appeared in the scene during capturing the frames, the starting frame may be selected from those frames where the face is included. In addition to or instead of mere presence of a face in the scene, the predetermined relevant change may require appearing of a predetermined human face feature in the scene. Such face feature may relate to any specific point of face, such as an eye, a nose, or a mouth, or to any predetermined expression. For example, it may relate to a smile detected in the scene. Further, in addition to or instead of information about presence of a face or a predetermined face feature, the predetermined relevant change may require appearing of a gaze in the scene.

The predetermined relevant change may also comprise a change in the lighting conditions at least at one location in the scene. A lighting condition at a location on the scene may result, for example, from use of a flashlight or from the sun going behind or coming from behind a cloud.

Further, the predetermined relevant change may also require a predetermined change, such as acceleration or deceleration, of a motion occurring in the scene.

The first camera condition may comprise any appropriate condition related to the state of the camera used to capture the frames of the preliminary frame sequence such that using said condition, an appropriate selection of the starting frame may be carried out. For example, it may require the camera to have a predetermined tilting position and/or a predetermined level of stability. The tilting position may be determined, for example, via an angle of a camera axis relative to a predetermined reference direction. Stability of the camera may relate to any kind of movement of the camera, such as shaking, vibration, or translational and/or rotational movement. Indication of fulfillment of the first camera condition may be available, for example, from any type of sensor, for example, an acceleration sensor or a gyroscope integrated in the camera or a device incorporating the camera. A further example of a camera condition which may be used as the first camera condition is requirement of some specific focus position, or actually the focus lens position, which is an indication of the distance from the camera to the focus point in the scene.

In the case of selecting the starting frame on the basis of fulfillment of both the starting scene condition and the first camera condition, one of those conditions may be used as a primary selection criterion. For example, with a starting scene condition requiring moving content in the scene, the moving content may be used as a primary criterion. For example, with no moving content at all determined in the preliminary frame sequence, a decision of forming no living image at all may be made. Then, the steps 102 to 104 of the process of FIG. 1 may be omitted. With constant movement of at least a part of the scene, a frame may be selected as the starting frame which produces a predetermined maximum length of the preceding image sequence of the living image. With movement in the scene lying between those extremes, the first camera condition may be used as a secondary criterion to decide the starting frame.

Alternatively, fulfillment of the first camera condition may be used as a primary starting frame selection criterion. For example, with fulfillment of a first camera condition requiring predetermined camera stability, the starting frame may be selected from those frames in which the stability of the camera exceeds a predetermined threshold condition. Then, from those frames possible to serve as the starting frame, the final selection may be made, for example, on the basis of fulfillment of the starting scene condition serving as a secondary selection criterion.

In another embodiment, one of the starting scene condition and the first camera condition alone may be used as a decisive criterion to select the starting frame.

In yet another embodiment, indications of fulfillment of the starting scene condition and the first camera condition may be used to cross-check the validity of each other. For example, differences between consequent frames of the preliminary frame sequence originating from camera shaking or vibration might be erroneously determined as indication of motion occurring in the scene. This may be corrected by utilizing, for example, indication of fulfillment of a first camera condition requiring a predetermined stability of the camera so that for the selection of the starting frame, the indication of fulfillment of motion occurring in the scene is considered valid only if also an indication of fulfillment of such first camera condition is obtained. Thereby, it may be possible to take into account only real motion in the scene.

In addition to the fulfillment of the starting scene condition and/or the first camera condition, also some further selection criterion may be used for selecting the starting frame of the displayable frame sequence. Such further criterion may be, for example, a user input received before or during capturing the frames of the preliminary frame sequence, which user input may relate, for example, to selecting a desired focus point or area corresponding to a specific target in the scene. For example, when user of the camera has indicated a preferred focus area or point, fulfillment of a starting scene condition in a frame portion corresponding to that specific area or point may be given increased weight in selecting the starting frame.

Another possible further selection criterion may be formed by setting a predetermined minimum length of the preceding image sequence of the living image. Such minimum length, according to the intended or normal playback procedure, may be, for example, 200 to 300 ms. If the other selection criteria for selecting the starting frame would produce a displayable frame sequence producing a shorter preceding image sequence of the living image, the starting frame may be selected to ensure such minimum length of the preceding image sequence.

"Obtaining" the preliminary frame sequence and the at least one still image frame, indications of fulfillment of the starting scene condition and the first camera condition, and possible further selection criteria refers to any appropriate way of providing available, for automatic processing purposes, data content(s) corresponding to those frames and/or particulars. For example, such data content(s) or part of them may be obtained via any data transmission path from a device, data server or, for example, a cloud service. They may also be stored on any appropriate data storage medium or device. Obtaining may also comprise generating the data content at issue, for example, via analysis of some appropriate data, such as a plurality of frames.

The method of FIG. 1 may be carried out in and by any appropriate device or apparatus. For example, it may be carried out in a digital camera or any other type of device having a digital camera unit or module. In such case, the analysis steps and the actual forming of the displayable frame sequence may be carried out substantially simultaneously with or immediately after the actual capturing of the frames. Alternatively, the steps of the method of FIG. 1 may be carried out as a post-capture procedure, i.e. afterwards separately from the actual capturing. Also then, the steps of the method of FIG. 1 may be carried out in or by a device or apparatus which also comprises the camera by which the frames were captured. In another approach, the image capturing and possible also the analysis steps are carried out by separately, outside the device or apparatus performing the actual method steps of FIG. 1. Such post-capture procedure may be carried out by any appropriate device or apparatus having suitable processing capabilities, for example, by a laptop computer.

The still image frame may differ by nature from the frames of the preliminary frame sequence. For example, it may differ from the frames of the preliminary frame sequence by at least one of its higher resolution, lower noise, or higher dynamic range in comparison to the frames of the preliminary frame sequence. The still image frame may be captured using a specific still image capturing procedure or mode. The frames of the preliminary frame sequence, in turn, may be captured using another capture procedure or mode, such as video capturing or burst capturing.

Figure 2:
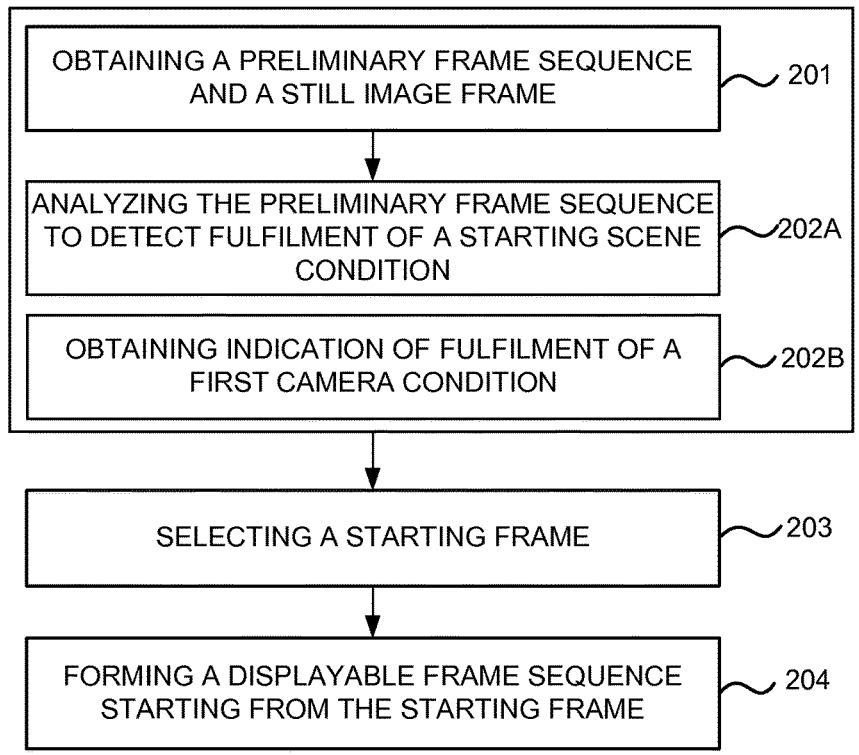
FIG. 2 illustrates a flow chart of a method.

The method of FIG. 2 differs from the method of FIG. 1 in that it comprises, instead of merely obtaining a ready determined indication of fulfillment of the starting scene condition, analyzing, in step 202A, a plurality of frames of the preliminary frame sequence to detect fulfillment of a starting scene condition in at least one frame of the preliminary frame sequence. In this method, the analysis may be considered as a part of "obtaining" the indication of fulfillment of the starting scene condition.

The number of frames analyzed may vary, for example, according to the starting scene condition to be determined. Generally, three or more frames may be analyzed. The analyzed frames may be consecutive ones. Alternatively, it is possible to analyze every second or every third frame, or a plurality of frames with any other appropriate interval. It is also possible to analyze frames iteratively so that first, a first frame subset of the preliminary frame sequence is analyzed to detect fulfillment of a sub-condition, and on the basis of the results of this first analysis step, a second frame subset is selected and analyzed.

In step 202B, indication of fulfillment of a first camera condition prevailing during capturing the preliminary frame sequence is obtained. Similarly to FIG. 1, this can comprise obtaining a ready determined indication. Alternatively, corresponding to the analysis step 202A, "obtaining" the fulfillment of the first camera condition may comprise receiving some preliminary information, such as a sensor output, relating to the first camera condition, and analyzing said information to detect fulfillment of the first camera condition.

The rest of the steps of the method of FIG. 2 are similar to the method of FIG. 1.

"Analyzing the frames" generally refers to investigating fulfillment of a condition in the frames. This can be carried out, for example, by adopting a set of predefined determination rules on the basis of which fulfillment of the condition can be detected. In the analysis, any appropriate determination processes and algorithms may be used to detect the fulfillment of the starting scene condition. Depending on the details of the starting scene condition, such may include, for example, motion detection and/or object tracking to reveal if the scene contains movement, i.e. living content, and face detection and/or face expression detection to detect, for example, a smiling person or a person blinking eyes in the scene. Depending on the nature of the actual starting scene condition, it may be possible that only a part of the image data contained in the frames is analyzed. For example, in an embodiment, only a subset of the image colors is analyzed. Such subset may comprise, for example, mere intensity in a selected image area instead of complete color information. For example, using the YCbCr color space family, it is then possible that only the "Y" component, i.e. the luminance, is analyzed.

The frames of the preliminary frame sequence may be analyzed during, i.e. simultaneously with, capturing the frames so that a frame is analyzed immediately once having been captured. Alternatively, analyzing of the frames may be carried out after the actual capturing.

In any of the methods of FIGS. 1 and 2, when only one still image frame is obtained, the displayable frame sequence may be formed so that the only still image frame forms the stopping frame.

Figure 3:
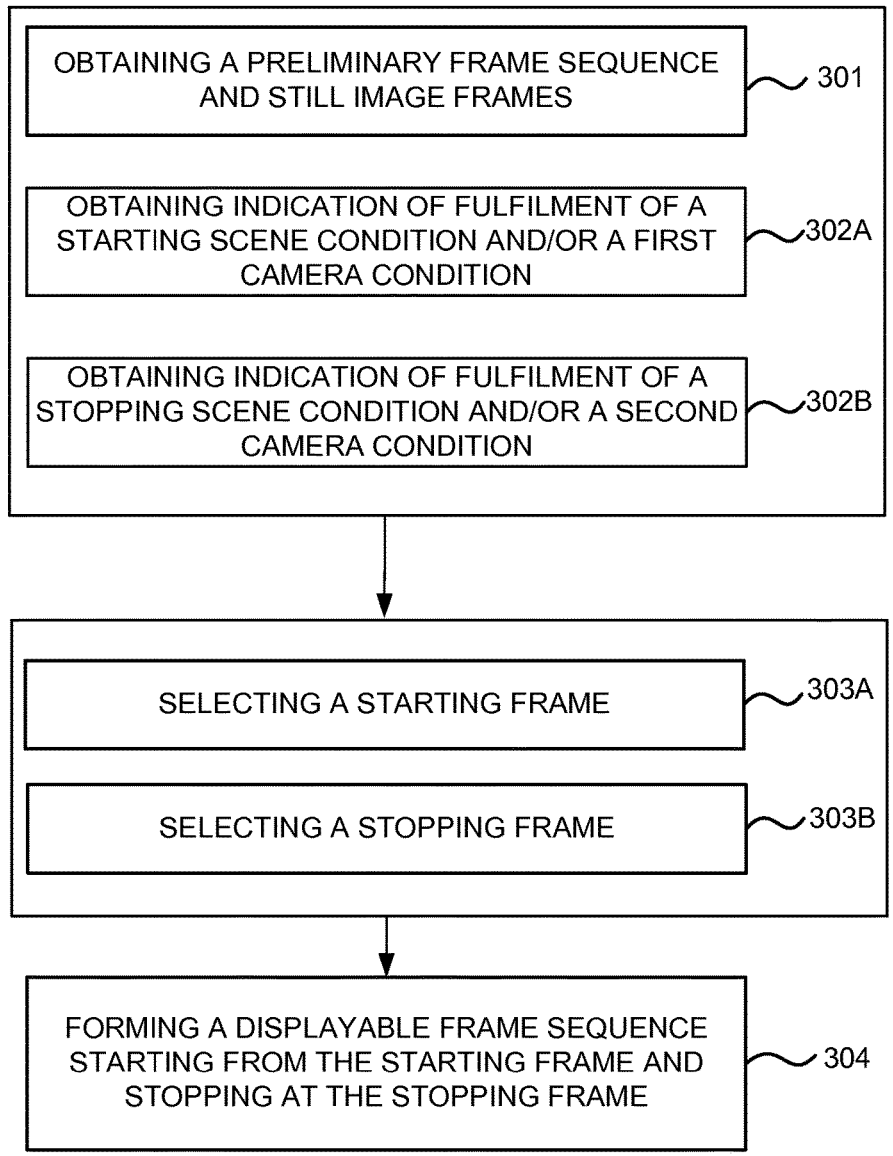
FIG. 3 illustrates a flow chart of a method.

Alternatively, when more than one still image frames are obtained, also the stopping end of the displayable frame sequence may be adjusted according to one or more selecting criteria. FIG. 3 illustrates a method of this type which differs from the method of FIG. 1 in that the method comprises obtaining, in step 302B, at least one of indication of fulfillment of a stopping scene condition in at least one of the still image frames and indication of fulfillment of a second camera condition prevailing during capturing the preliminary frame sequence. The method further comprises automatically selecting, in step 303B, the stopping frame from the still image frames on the basis of at least one of fulfillment of the stopping scene condition and fulfillment of the second camera condition. Then, in step 304, a displayable frame sequence is formed, stopping at the stopping frame. Obtaining a preliminary frame sequence and at least one still image frame in step 301, indication of fulfillment of a starting scene condition and/or indication of fulfillment of a first camera condition in step 302A, and selecting a starting frame in step 303A may be carried out similarly to the steps of 101, 102, and 103, respectively, of the method of FIG. 1.

The stopping scene condition may comprise any appropriate condition(s) based on which a reasonable selection of the stopping frame may be made require. It may require, for example, occurrence of some predetermined change of movement of at least part of the scene or an object within the scene. For example, such condition may require slowing or stopping of some particular movement during capturing of the still image frames. As stated above, movement may be, for example, translational and/or rotational, or of any other type. In another embodiment, the stopping scene condition may require some other predetermined relevant change occurring in the scene. Corresponding to the method of FIG. 1, such relevant change may relate, for example, to presence of a human face or some predetermined face feature or a gaze in the scene covered by the frames.

The second camera condition may comprise any appropriate condition(s) based on which a reasonable selection of the stopping frame may be made. It may be, for example, similar to any of those first camera conditions discussed above.

An analyzing step similar to that of the method of FIG. 2 for detecting fulfillment of the starting scene condition in at least one frame of the preliminary frame sequence may be included in the method of FIG. 3 also. Correspondingly, when a plurality of still image frames are obtained, the method of FIG. 3 may also comprise analyzing one or more still image frames to detect fulfillment of the stopping scene condition instead of merely obtaining ready determined indication of such fulfillment in at least one of the still image frames.

Figure 4:
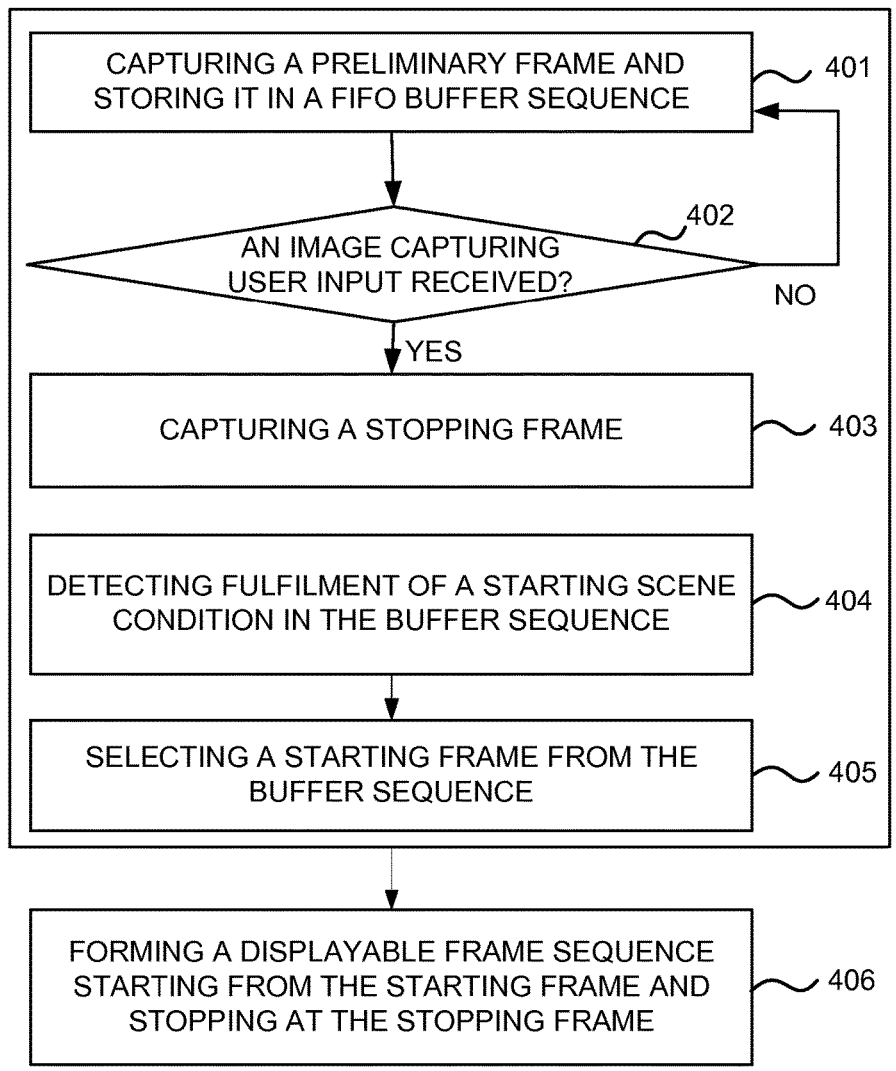
FIG. 4 illustrates a flow chart of a method.

The method of FIG. 4 starts by sequentially capturing, in step 401 which is repeated as long as an image capturing user input is received in step 402, preliminary frames by a digital camera shooting a scene, and storing the thereby captured preliminary frames into a first-in-first-out (FIFO) type buffer sequence having a predetermined number of frames. Thus, the method of FIG. 4 also comprises the capturing phase instead of merely obtaining ready captured frames.

"Sequential" capturing of frames by a digital camera shooting a scene refers to continuous operation where consequent frames, following each other in time, are captured, the frames representing the same scene at consequent moments. The camera may be moving during the capture, wherein the part of the scene covered by a single frame changes frame to frame.

The preliminary frames may be captured in quick succession using, for example, a video capture mode, or a burst capture mode, or a continuous high speed still image capture mode. The preliminary frames may be captured with constant intervals between the consecutive frames. The interval may correspond, for example, to any standard video displaying frame rate. In general, the preliminary frames may be captured with an interval of 5 to 100 ms between the consecutive frames. Instead of a constant interval, the frames of the preliminary frame sequence may be captured with non-constant capturing frame rate.

The digital camera may be of any type capable of performing such capture of sequential frames with short intervals. It may be a stand-alone camera apparatus, such as a compact camera, a digital SLR (single-lens reflex) camera, or a digital mirrorless interchangeable-lens camera. Alternatively, it may be a camera module or element incorporated in an apparatus or device, such as a mobile or wearable device.

The first-in-first-out type buffer sequence having a predetermined number of frames forms a preliminary frame sequence with a continuously changing set of preliminary frames. First-in-first-out refers to a principle according to which, when a new frame is captured and stored into the buffer, the oldest frame is removed therefrom. Thereby, the buffer holds all the time the predetermined number of most recent preliminary frames. The FIFO buffer may be, for example, a ring buffer.

The sequential capturing of frames and the storing of the captured frames into the FIFO buffer may be carried out as a continuous operation always when the camera is in use and ready for image capturing initiated by the user of the camera. Thus, the FIFO buffer may be maintained and updated continuously also when no actual image capturing is initiated by the user. Updating the FIFO buffer sequence by storing there new preliminary frames is stopped when an image capturing user input is received, whereby the content of the buffer sequence is fixed. Possible reception of an image capturing user input is checked after capturing and storing each new preliminary frame.

The image capturing user input refers to a command from the user of the camera to capture an image. The user may generate this command in any appropriate manner. For example, the camera or the device in which a camera is incorporated may have an image capture triggering button. In devices with a user interface comprising a touch screen, the user input may be given simply by touching the touch screen, possibly at a specific location thereon. The image capturing user input may be prepared and obtained as any appropriate type of signal or data.

After receiving the image capturing user input, the method comprises capturing, in step 403, a stopping frame in response to the image capturing user input. The stopping frame may be captured using a still image capture mode, a video capture mode, or any other appropriate capture mode. Similarly to the still image frame of the method of FIG. 1, the stopping frame may be captured so as to differ from the preliminary frames, for example, by at least one of its higher resolution, lower noise, or higher dynamic range. There may be a time interval, for example, of up to 200 ms between capturing of the last frame of the preliminary frame sequence before receiving the image capturing user input, and capturing the still image frame. Alternatively, that interval may be similar to the interval between capturing consequent frames of the preliminary frame sequence.

The method of FIG. 4 further comprises automatically detecting, in step 404, fulfillment of a starting scene condition in at least one preliminary frame of the buffer sequence. This detecting may be based on an analysis similar to the analysis step 202A of the method of FIG. 2. Thus, a plurality of preliminary frames of the fixed buffer sequence may be analyzed to detect fulfillment of the starting scene condition in at least one preliminary frame. The number of preliminary frames analyzed may be selected similarly to the method of FIG. 2.

Alternatively, each frame may be analyzed directly after capturing thereof, and information about fulfillment or non-fulfillment of the starting scene condition in that frame may be stored in any appropriate manner. In this approach, it may be straightforward to check such information associated with each preliminary frame of the fixed buffer sequence to detect fulfillment of the starting scene condition in at least one of the preliminary frames.

With fulfillment of the starting scene condition having been detected, the method comprises automatically selecting, in step 405, a starting frame from the buffer sequence on the basis of fulfillment of the starting scene condition. Further, a displayable frame sequence is automatically formed in step 406, which can be later displayed, in or by the device which performed the actual capturing of the frames, or in or by some other device or apparatus, as a living image of the scene. The displayable frame sequence is formed so as to start by the starting frame and stop at the stopping frame for displaying the still image. Similarly to the methods of FIGS. 1 to 3, the final displayable frame sequence may have a maximum length corresponding to a preceding image sequence length of one or a couple of, for example, 3 seconds.

In the method of FIG. 4, the starting scene condition and the first camera condition may be similar to any of those starting scene conditions and first camera conditions discussed above with reference to the methods of FIGS. 1 and 2.

Figure 5:
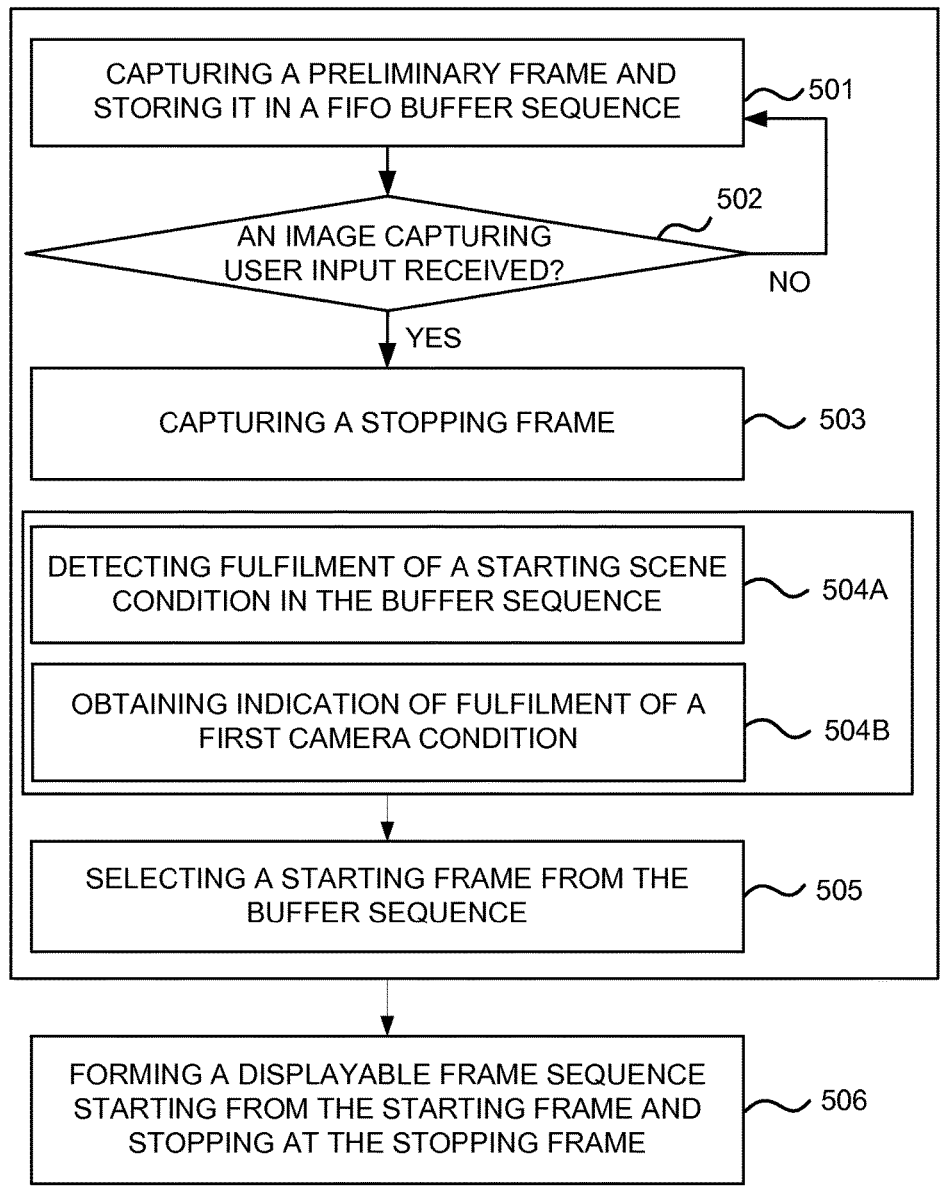
FIG. 5 illustrates a flow chart of a method.

The method of FIG. 5 differs from that of FIG. 4 in that in addition to detecting fulfillment of a starting scene condition in step 504A, the method further comprises obtaining, in step 504B, indication of fulfillment of a first camera condition prevailing during capturing the preliminary frames, wherein automatically selecting the starting frame from the buffer sequence in step 505 is carried out on the basis of fulfillment of the starting scene condition and fulfillment of the first camera condition. Similarly to the method of FIG. 1, one of the starting scene condition and the first camera condition may be used as a primary condition in selecting the starting frame, or the starting scene condition and the first camera condition may be used to cross-check the validity of each other. Similarly to the methods of FIGS. 1 and 2, the first camera condition may comprise, for example, stability and/or tilting state of the camera.

In the method of FIG. 5, the starting scene condition and the first camera condition may be similar to any of those starting scene conditions and first camera conditions discussed above with reference to the methods of FIGS. 1 and 2.

Capturing the stopping frame in the methods of FIGS. 4 and 5 may comprise capturing a frame using, for example, a still image capture mode or a video capture mode immediately after obtaining the image capturing user input.

Figure 6:
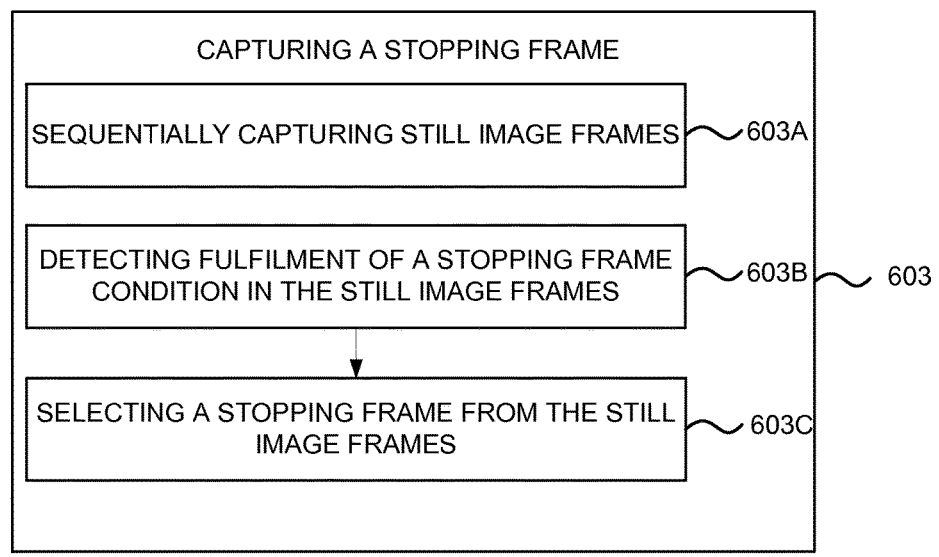
FIG. 6 illustrates a flow chart of a part of a method.

FIG. 6 illustrates details of a step 603 of capturing a stopping frame. Said capturing of the stopping frame may be carried out as a part of a method according to any of FIGS. 4 and 5.

In the process of FIG. 6, capturing the stopping frame comprises sequentially capturing, in step 603A, still image frames; automatically detecting, in step 603B, fulfillment of a stopping scene condition in at least one of the still image frames captured after receiving the image capturing user input; and selecting, in step 603C, the stopping frame from the frames captured after obtaining the image capturing user input on the basis of the stopping scene condition. Detecting the fulfillment of the stopping scene condition may be based on analysis of one or more still image frames.

In this approach, instead of immediately capturing a stopping frame, a plurality of still image frames are sequentially captured after receiving the image capturing user input. Capturing may be continued for a predetermined number of still image frames, for example, 1 to 5 or 10 frames. The stopping scene condition may be, for example, similar to any of the stopping scene conditions discussed above with reference to the method of FIG. 3. When fulfillment of a stopping scene condition is detected in at least one of the still image frames, one of the still image frames is selected as the stopping frame on the basis of said fulfillment. For example, when occurring of a predetermined face feature is recognized in a frame, that frame may be selected as the stopping frame.

The approach of FIG. 6 may allow optimizing the stopping frame capturing so that some undesired effect, for example, closed eyes of a person in the scene, is avoided in the still image formed on the basis of the stopping frame.

In addition to, or instead of fulfillment of a stopping scene condition, selection of the stopping frame may be based on fulfillment of a second camera condition which may be, for example, similar to any of those second camera conditions discussed above with reference to the method of FIG. 3.

In an embodiment, instead of immediately capturing a stopping frame or first capturing a plurality of still image frames and selecting the stopping frame therefrom, the stopping frame capturing may be initiated, after receiving the image capturing user input, on the basis of fulfillment of a second camera condition which may be, for example, similar to any of those second camera conditions discussed above with reference to the method of FIG. 3. In this embodiment, it is thus possible that only one frame is captured and used as the stopping frame, capturing being initiated only after fulfillment of such second camera condition. There may be some predetermined maximum time after receiving the image capturing user input, after which time the stopping frame is captured irrespective of fulfillment of the second camera condition.

In the methods of FIGS. 1 to 6, the steps of the methods may be carried out, whenever appropriate, in any order, and possibly at least partially overlapping in time. Performing the steps is not limited to any specific order, except of those cases where specific order is explicitly stated. In the flow diagrams of FIGS. 1 to 6, arrows are used to mark consecutively performable steps.

In the above, aspects mainly related to method embodiments are discussed. In the following, more emphasis will be given on device and apparatus aspects.

What is described above about the definitions, details, ways of implementation, and advantageous effects of the methods apply, mutatis mutandis, to the device and apparatus aspects discussed below. The same apply vice versa. Further, the following apparatuses and devices are examples of equipment for performing the methods described above. The other way round, the previous methods are examples of possible ways of operation of the apparatuses and devices described below.

Figure 7:
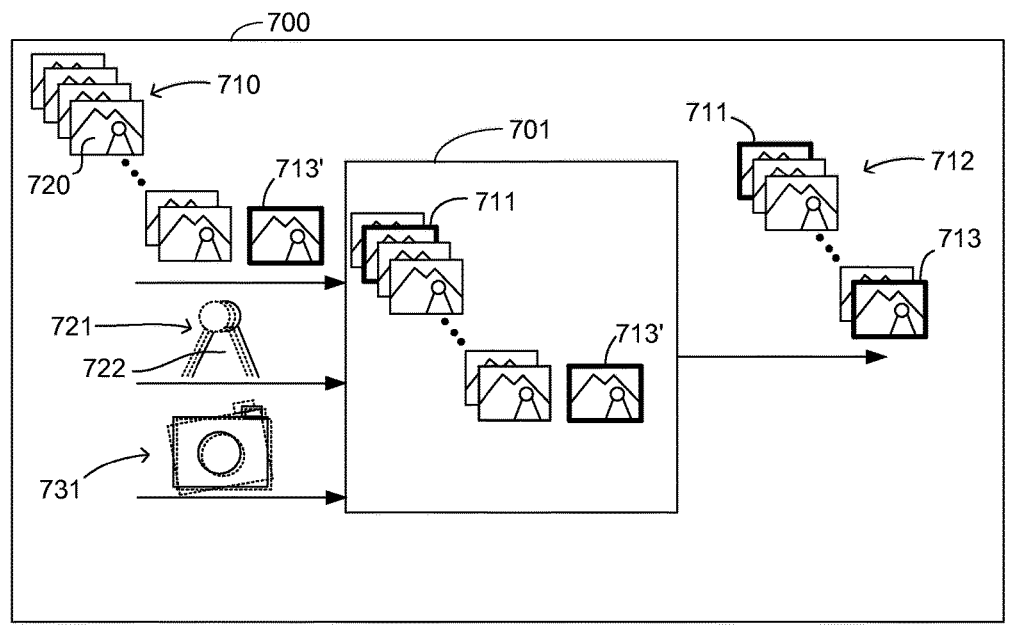
FIG. 7 illustrates an apparatus.

The apparatus 700 of FIG. 7 comprises an image processing unit 701. The image processing unit is configured to form, from a preliminary frame sequence, a displayable frame sequence for displaying a living image of a scene shot by a digital camera, the living image comprising a still image and a preceding image sequence. In the following, the operation of the image processing unit, when in use, is discussed.

When in use, the image processing unit obtains a preliminary frame sequence 710 and a still image frame 713, the frames being captured by a digital camera during shooting a scene 720. The image processing unit also obtains indication of fulfillment of a starting scene condition 721, which in the embodiment of FIG. 7 requires movement in the scene. In FIG. 7, such movement is illustrated by movement of a person 722 in the scene 720 in the preliminary frame sequence. Further, the image processing unit obtains indication of fulfillment of a first camera condition 731, which in the embodiment of FIG. 7 requires predetermined stability and/or tilting state of the camera used to capture the frames. The stability and/or the tilting state refer to those which prevailed during capturing the frames of the preliminary frame sequence.

In the embodiment of FIG. 7, the camera is not a part of the apparatus 700 and is thus not illustrated. The preliminary frame sequence 710 and the still image frame 713, and indications of fulfillment of the starting scene condition 721 and the first camera condition 731 may be obtained in any appropriate electronic data form(s), and using any appropriate data transfer equipment and principles.

When the preliminary frame sequence 710 and the still image frame 713, as well as indications of fulfillment of the starting scene condition 721 and the first camera condition 731 has been obtained, the image processing unit selects a starting frame 711 from the preliminary frame sequence on the basis of at least one of fulfillment of the starting scene condition and the first camera condition. Then, it forms, from the preliminary frame sequence and the still image frame, a displayable frame sequence 712 suitable for displaying a living image of the scene, the displayable frame sequence starting by the starting frame 711 and having the still image frame serving as a stopping frame 713 for displaying the still image.

The formed displayable frame sequence may be stored in a memory possibly present the image processing unit 701 or elsewhere in the apparatus 700. Alternatively, or additionally, it may be transmitted further from the apparatus. The apparatus 700 may be further configured to display the living image.

In one embodiment, the image processing unit 701 may obtain merely one of fulfillment of a starting scene condition and a first camera condition, and select the starting frame accordingly.

In one embodiment, instead of or in addition to merely obtaining ready detected indication of fulfillment the starting scene condition, the image processing unit 701 may be further configured to analyze the plurality of the frames of the preliminary frame sequence to detect fulfillment of the starting scene condition.

In an alternative embodiment, similarly to the method embodiments discussed above, the image processing unit may obtain a plurality of still image frames, from which it selects one to serve as the stopping frame.

Being "configured to" perform the above operations when in use refers to the capability of and suitability of the image processing unit for such operations. This may be achieved in various ways. For example, the image processing unit may comprise at least one processor and at least one memory coupled to the at least one processor, the memory storing program code instructions which, when run on the at least one processor, cause the processor to perform the action(s) at issue. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The apparatus 700 may be implemented as an apparatus of any type capable of being configured to carry out the operation steps as discussed above. Examples include a laptop, a personal computer, and any other types of general purpose data processing apparatuses and devices. It may also be implemented as a mobile device, such as a mobile phone, a smart phone, a tablet computer, or a wearable device of any appropriate type.

Being illustrated as one unit in the schematic drawing of FIG. 7 does not necessitate that the image processing unit 701 is implemented as a single element or component. It may comprise two or more sub-units or sub-systems which each may be implemented using one or more physical components or elements.

Instead of, or in addition to the operations described above, the image processing unit 701 of the apparatus 700 of FIG. 7 may be configured to operate, when in use, according to any of the methods discussed above with reference to FIGS. 1 to 6.

The apparatus 800 differs from the apparatus 700 of FIG. 7 first in that it further comprises a digital camera 840. With the apparatus in use, the digital camera 840, which may be incorporated in the apparatus as a camera module, captures a preliminary frame sequence 810 and two still image frames 813' while shooting a scene 820. Also more still image frames may be obtained in other embodiments. An image processing unit 801 obtains the preliminary frame sequence 710 and the still image frames 813'. It also obtains indication of fulfillment of a first camera condition 831 similar to the first camera condition 731 of the embodiment of FIG. 7 from a motion sensor 850 incorporated in the apparatus in connection with the camera 840.

Figure 8:
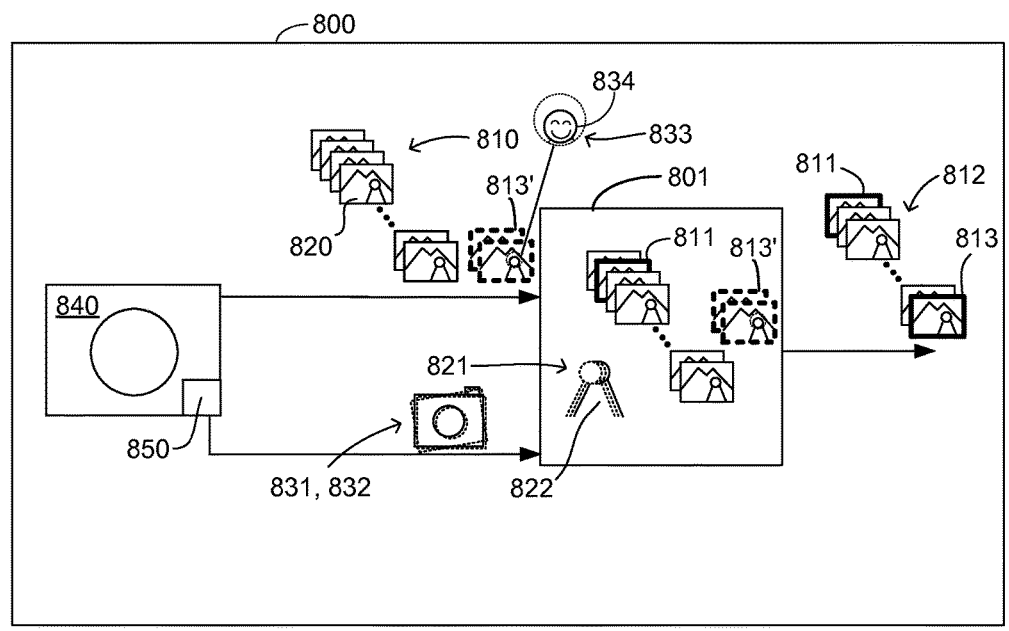
FIG. 8 illustrates an apparatus.
The drawings of the FIGs. are not in scale.

The apparatus 800 differs from the apparatus 700 of FIG. 7 also in that instead of merely obtaining indication of fulfillment of a starting scene condition, the image processing 801 unit analyzes, when in use, the preliminary frame sequence 810 to detect fulfillment of a starting scene condition 821 in at least one frame of the preliminary frame sequence. FIG. 8 illustrates an example where movement of a person 822 represents fulfillment of a starting scene condition requiring movement occurring in the scene.

Having obtained the preliminary frame sequence 810, as well as indications of fulfillment of the starting scene condition and the first camera condition available, the image processing unit selects, similarly to the embodiment of FIG. 7, a starting frame 811 from the preliminary frame sequence on the basis of fulfillment of at least one of the starting scene condition and the first camera condition.

The image processing unit also analyzes, when in use, the two still images frames 813' to detect fulfillment of a stopping scene condition 833 in at least one frame of the still image frames. In FIG. 8, a stopping scene condition requiring smiling face 834 in the scene is illustrated. The image processing unit then selects one of the still image frames 813' to serve as a stopping frame 813 of the displayable frame sequence. Instead of or in addition to fulfillment of the stopping scene condition, also fulfillment of a second camera condition 832, which may be in accordance with any of the second camera conditions discussed above, may be used as a selection criterion for selecting the stopping frame. The image processing unit may obtain ready determined indication of fulfillment of a second camera condition in at least on still image frame, or it may analyze still image frames to detect fulfillment of such second camera condition.

Having the starting and stopping frames selected, the image processing unit forms, from the preliminary frame sequence 810 and the still image frames 813', a displayable frame sequence 812 suitable for displaying a living image of the scene, the displayable frame sequence starting by the starting frame 811 and having the selected still image frame 813 as a stopping frame 813 for displaying the still image.

Instead of, or in addition to the operations described above, the image processing unit 801 and the digital camera 840 of the apparatus 800 may be configured to carry out a method in accordance with any of the embodiments discussed above with reference to FIGS. 4 to 6.

The apparatus 800 of FIG. 8 may be implemented as a camera device, or as a device of any other type incorporating a digital camera or camera module. For example, the apparatus may be implemented as a mobile electronic device, such as a mobile phone, a smart phone or a tablet computer.

By the methods and the apparatuses of FIGS. 1 to 8, dynamic adjustment of length of living images may be achieved. By dynamic adjustment of the living image length, a living image may be produced which comprises the most relevant features of the captured moment.

Some embodiments are further discussed shortly in the following.

In a method aspect, a method may be implemented for forming a displayable frame sequence for displaying a living image of a scene. The method comprises: obtaining a preliminary frame sequence and at least one still image frame, captured by a digital camera during shooting a scene; obtaining at least one of indication of fulfillment of a predetermined starting scene condition in at least one frame of the preliminary frame sequence and indication of fulfillment of a predetermined first camera condition prevailing during capturing the preliminary frame sequence; automatically selecting a starting frame from the preliminary frame sequence on the basis of at least one of fulfillment of the starting scene condition in at least one frame of the preliminary frame sequence and fulfillment of the first camera condition prevailing during capturing the preliminary frame sequence; and automatically forming, from the preliminary frame sequence and the at least one still image frame, a displayable frame sequence for displaying a living image of the scene, the living image comprising a still image and a preceding image sequence, the frame sequence starting by the starting frame and having a still image frame as a stopping frame for displaying the still image.

In an embodiment, the method comprises analyzing a plurality of frames of the preliminary frame sequence to detect fulfillment of a starting scene condition in at least one frame of the preliminary frame sequence. The plurality of frames may comprise, for example, at least three frames.

In an embodiment which may be in accordance with the preceding embodiment, the predetermined starting scene condition requires movement occurring in the scene.

In an embodiment which may be in accordance with any of the preceding embodiments, the predetermined starting scene condition requires a predetermined relevant change occurring in the scene. The relevant change occurring in the scene may comprise, for example, at least one of appearing of a human face in the scene, appearing of a predetermined human face feature in the scene, and appearing of a gaze in the scene. Alternatively, or in addition, the predetermined relevant change may comprise, for example, a change in the lighting conditions at least at one location in the scene.

In an embodiment which may be in accordance with any of the preceding embodiments, the first camera condition requires the camera having at least one of a predetermined tilting position and predetermined stability.

In an embodiment wherein a plurality of still image frames are obtained, the method further comprises: obtaining at least one of indication of fulfillment of a predetermined stopping scene condition in at least one frame of the still image frames and indication of fulfillment of a predetermined second camera condition prevailing during capturing the still image frames; and automatically selecting the stopping frame from the still image frames on the basis of at least one of fulfillment of the stopping scene condition and fulfillment of the second camera condition.

In an embodiment which may be in accordance with any of the preceding embodiments, the at least one still image frame differs from the frames of the preliminary frame sequence by at least one of its higher resolution, lower noise, or higher dynamic range.

In an embodiment which may be in accordance with any of the preceding embodiments, the displayable frame sequence has a length corresponding to a duration of the preceding image sequence of less than or equal to 3 seconds, for example, less than or equal to 1 second.

In another method aspect, a method may be implemented for forming a displayable frame sequence for displaying a living image of a scene. The method comprises: sequentially capturing preliminary frames by a digital camera shooting a scene, and storing the sequentially captured preliminary frames into a first-in-first-out type buffer sequence having a predetermined number of frames; receiving an image capturing user input; capturing a stopping frame in response to the image capturing user input; automatically detecting fulfillment of a starting scene condition in at least one preliminary frame of the buffer sequence; automatically selecting a starting frame from the buffer sequence on the basis of fulfillment of the starting scene condition; and automatically forming a displayable frame sequence for displaying a living image of the scene, comprising a still image and a preceding image sequence, the displayable frame sequence starting by the starting frame and stopping at the stopping frame for displaying the still image.

In an embodiment, the starting scene condition requires movement of at least part of the scene relative to the digital camera.

In an embodiment which may be in accordance with the above embodiment, the predetermined starting scene condition requires a predetermined relevant change occurring in the scene. The relevant change occurring in the scene may comprise, for example, at least one of appearing of a human face in the scene, appearing of a predetermined human face feature in the scene, and appearing of a gaze in the scene. Alternatively, or in addition, the predetermined relevant change may comprise, for example, a change in the lighting conditions at least at one location in the scene.

In an embodiment which may be in accordance with any of the preceding embodiments, the method further comprises obtaining indication of fulfillment of a predetermined first camera condition during capturing the buffer sequence, wherein automatically selecting the starting frame from the buffer sequence is carried out on the basis of fulfillment of the starting scene condition and the first camera condition. The first camera condition may require, for example, the camera having at least one of a predetermined tilting position and predetermined stability.

In an embodiment which may be in accordance with any of the preceding embodiments, capturing the stopping frame comprises: sequentially capturing still image frames; automatically detecting fulfillment of a stopping scene condition in at least one of the still image frames captured after obtaining the image capturing user input; and selecting the stopping frame from the still image frames captured after obtaining the image capturing user input on the basis of fulfillment of the stopping scene condition.

In an apparatus aspect, an apparatus may be implemented which is configured to form a displayable frame sequence for displaying a living image of a scene. The apparatus comprises an image processing unit configured to: obtain a preliminary frame sequence and at least one still image frame, captured by a digital camera during shooting a scene; obtain at least one of indication of fulfillment of a predetermined starting scene condition in at least one frame of the preliminary frame sequence and indication of fulfillment of a predetermined first camera condition prevailing during capturing the preliminary frame sequence; select a starting frame from the preliminary frame sequence on the basis of at least one of fulfillment of the starting scene condition in at least one frame of the preliminary frame sequence and fulfillment of the first camera condition prevailing during capturing the preliminary frame sequence; and form, from the preliminary frame sequence and the at least one still image frame, a displayable frame sequence for displaying a living image of the scene, the living image comprising a still image and a preceding image sequence, the displayable frame sequence starting by the starting frame and having a still image frame as a stopping frame for displaying the still image.

In an embodiment, the image processing unit is configured to analyze a plurality of frames of the preliminary frame sequence to detect fulfillment of a starting scene condition in at least one of the preliminary frame sequence. The plurality of frames may comprise, for example, at least three frames.

In an embodiment which may be in accordance with the preceding embodiment, the predetermined starting scene condition requires movement occurring in the scene.

In an embodiment which may be in accordance with any of the preceding embodiments, the predetermined starting scene condition requires a predetermined relevant change occurring in the scene. The relevant change occurring in the scene may comprise, for example, at least one of appearing of a human face in the scene, appearing of a predetermined human face feature in the scene, and appearing of a gaze in the scene. Alternatively, or in addition, the predetermined relevant change may comprise, for example, a change in the lighting conditions at least at one location in the scene.

In an embodiment which may be in accordance with any of the preceding embodiments, the first camera condition requires the camera having at least one of a predetermined tilting position and predetermined stability.

In an embodiment wherein the image processing unit is configured to obtain a plurality of still image frames, the image processing unit is further configured to: obtain at least one of indication of fulfillment of a predetermined stopping scene condition in at least one of the still image frames and indication of fulfillment of a predetermined second camera condition prevailing during capturing the still image frames; and automatically select the stopping frame from the still image frames on the basis of at least one of fulfillment of the stopping scene condition and fulfillment of the second camera condition.

In an embodiment which may be in accordance with any of the preceding embodiments, the at least one still image frame differs from the frames of the preliminary frame sequence by at least one of its higher resolution, lower noise, or higher dynamic range.

In an embodiment which may be in accordance with any of the preceding embodiments, the displayable frame sequence has a length corresponding to a duration of the preceding image sequence of less than or equal to 3 seconds, for example, less than or equal to 1 second.

In an embodiment which may be in accordance with any of the preceding embodiments, the apparatus further comprises a digital camera unit configured to capture frames, the image processing unit being connected to the digital camera unit to obtain the captured frames.

In an embodiment which may be in accordance with any of the preceding embodiments, the apparatus is implemented as a mobile electronic device.

Although some of the present embodiments may be described and illustrated herein as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in lap top computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term "comprising" is used in this specification to mean including the features followed thereafter, without excluding the presence of one or more additional features.

The invention claimed is:

1. A method comprising:
   capturing a preliminary image frame sequence by a digital camera;
   receiving a request to capture a still image frame by the digital camera during a shooting of a scene;
   based on the received request, capturing the still image frame;
   upon capturing the still image frame, stopping the capturing of the preliminary image frame sequence;
   obtaining at least one of an indication of a fulfillment of a predetermined starting scene condition in at least one image frame of the captured preliminary image frame sequence;
   obtaining an indication of a fulfillment of a predetermined first camera condition prevailing during the capturing of the preliminary image frame sequence;
   automatically selecting, from the captured preliminary image frame sequence, a starting image frame for a displayable image frame sequence based on at least one of the fulfillment of the predetermined starting scene condition and the fulfillment of the predetermined first camera condition, wherein the predetermined starting scene condition is movement occurring in the scene; and
   automatically forming, from the captured preliminary image frame sequence and the still image frame, a living image of the scene based on the displayable image frame sequence, the living image of the scene starting with the starting image frame and having the captured still image frame as a last image frame in the living image of the scene.

2. A method as defined in claim 1, further comprising analyzing a plurality of image frames of the captured preliminary image frame sequence to detect a fulfillment of a starting scene condition in at least one image frame of the captured preliminary image frame sequence.

3. A method as defined in claim 2, wherein the plurality of image frames comprises at least three image frames.

4. A method as defined in claim 1, wherein the starting scene condition requires movement of a human occurring in the scene.

5. A method as defined in claim 1, wherein the starting scene condition requires a predetermined relevant change occurring in the scene.

6. A method as defined in claim 1, wherein the first camera condition requires the camera having at least one of a predetermined tilting position and a predetermined stability.

7. A method as defined in claim 1, wherein a plurality of still image frames are obtained, the method further comprising:
   obtaining at least one of indication of a fulfillment of a predetermined stopping scene condition in at least one of the plurality of still image frames and an indication of a fulfillment of a predetermined second camera condition prevailing during the capturing of the plurality of still image frames; and
   automatically selecting a stopping image frame from the plurality of still image frames based on at least one of a fulfillment of the predetermined stopping scene condition and a fulfillment of the predetermined second camera condition.

8. A method as defined in claim 1, wherein the still image frame differs from image frames of the captured preliminary image frame sequence by at least one of its higher resolution, lower noise, or higher dynamic range.

9. A method as defined in claim 1, wherein the displayable image frame sequence has a length corresponding to a duration of a preceding image frame sequence of less than or equal to 3 seconds.

10. A method comprising:
   sequentially capturing preliminary image frames by a digital camera;
   receiving an image capturing request;
   capturing an image frame in response to the image capturing request;
   upon capturing the image frame, stopping a capture of the sequentially capturing preliminary image frames;
   upon stopping the capture of the sequentially capturing preliminary image frames, storing the sequentially captured preliminary image frames into a buffer sequence having a predetermined number of image frames;
   automatically detecting fulfillment of a starting scene condition in at least one preliminary image frame of the buffer sequence, wherein the starting scene condition is movement occurring in a scene;
   automatically selecting a starting image frame for a displayable image frame sequence from the buffer sequence based at least on a fulfillment of the starting scene condition; and
   automatically forming a living image of the scene based on the displayable image frame sequence, the living image of the scene starting with the starting image frame and ending with the captured image frame.

11. A method as defined in claim 10, wherein the starting scene condition requires movement of at least part of the scene relative to the digital camera.

12. A method as defined in claim 10, wherein the starting scene condition requires a predetermined relevant change occurring in the scene.

13. A method as defined in claim 12, wherein the predetermined relevant change comprises at least one of a human face appearing in the scene, a predetermined human face feature appearing in the scene, and a gaze appearing in the scene.

14. A method as defined in claim 12, wherein the predetermined relevant change comprises a change in lighting conditions at least at one location in the scene.

15. A method as defined in claim 10, further comprising obtaining an indication of a fulfillment of a predetermined first camera condition during the storing of the sequentially captured preliminary image frames in the buffer sequence, wherein automatically selecting the starting image frame from the buffer sequence is carried out based at least on a fulfillment of the starting scene condition and the predetermined first camera condition.

16. A method as defined in claim 15, wherein the predetermined first camera condition requires the camera having a predetermined tilting.

17. A method as defined in claim 16, wherein the predetermined first camera condition further requires the camera having a predetermined stability.

18. An apparatus comprising an image processing unit programmed to perform operations comprising:
 capturing a preliminary image frame sequence by a digital camera;
 receive a request to capture a still image frame by the digital camera during a shooting of a scene;
 based on the received request, capture the still image frame;
 based on the capturing of the still image frame, stop the capturing of the preliminary image frame sequence;
 obtain at least one of an indication of a fulfillment of a predetermined starting scene condition in at least one image frame of the captured preliminary image frame sequence and an indication of a fulfillment of a predetermined first camera condition prevailing during the capturing of the preliminary image frame sequence;
 select, from the captured preliminary image frame sequence, a starting image frame for a displayable image frame sequence based on at least one of the fulfillment of the predetermined starting scene condition and the fulfillment of the predetermined first camera condition, wherein the starting scene condition is movement occurring in the scene; and
 form, from the captured preliminary image frame sequence and the still image frame, a living image of the scene based on the displayable image frame sequence, the living image of the scene starting with the starting image frame and having the still image frame as a last image frame in the living image of the scene.

19. An apparatus as defined in claim 18, further comprising a digital camera unit configured to capture image frames, the image processing unit being connected to the digital camera unit to obtain the captured image frames.

20. An apparatus as defined in claim 19, implemented as a mobile electronic device.

* * * * *